Aug. 22, 1944.   H. BÄHRING   2,356,558
TRANSFORMER
Filed June 18, 1940
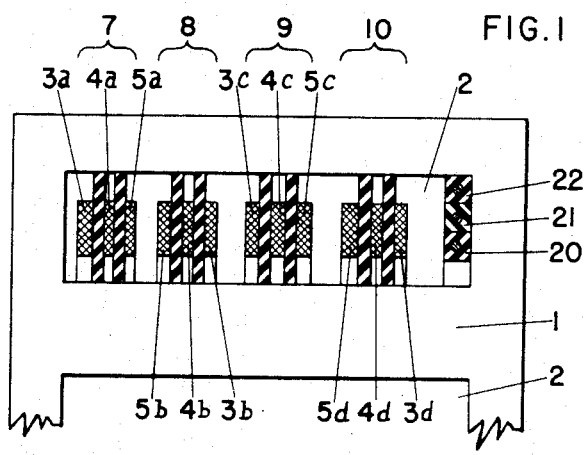
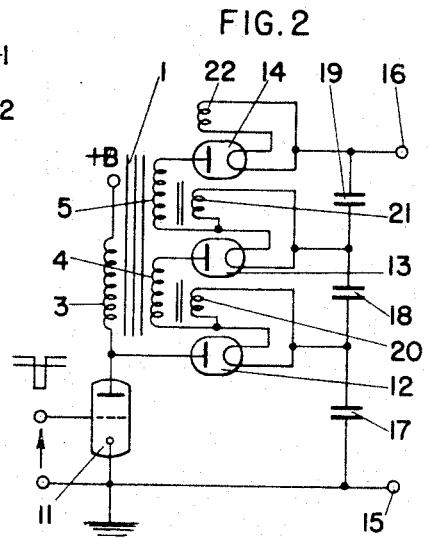
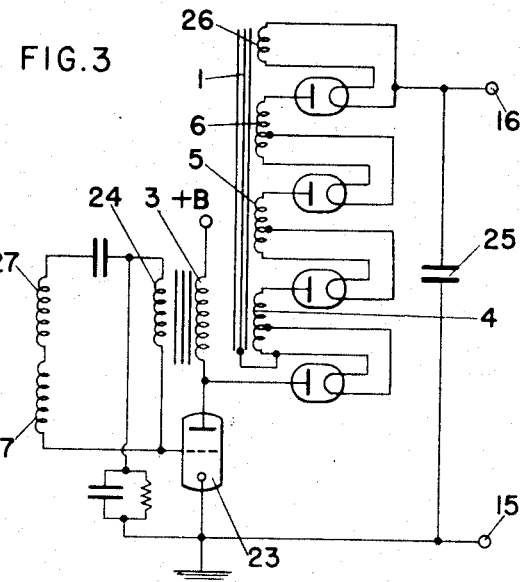
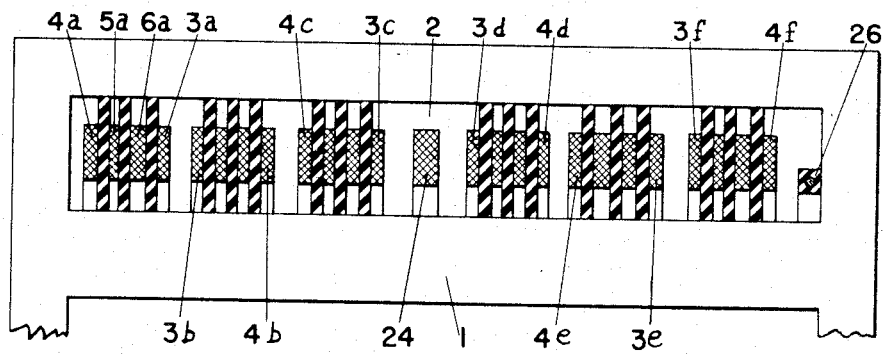
INVENTOR
HERBERT BÄHRING
BY
ATTORNEY Patented Aug. 22, 1944

2,356,558

UNITED STATES PATENT OFFICE 2,356,558

TRANSFORMER

Herbert Bähring, Klein Machnow, near Berlin, Germany; vested in the Alien Property Custodian Application June 18, 1940, Serial No. 341,170
In Germany July 1, 1939

9 Claims. (Cl. 175—363)

The invention relates to transformers used in connection with saw-tooth oscillators for the deflection of cathode rays, for example for television or oscillograph purposes. The invention relates particularly to transformers from which a high tension is derived as anode potential for the operation of the cathode ray tube.

It is an object of the invention to provide a transformer having two or more high-tension windings of very low capacitance connected to a similar number of rectifying tubes. A further object is to provide an arrangement of the windings in such a manner that points of equal alternating potential are situated adjacent to one another. It is a further object to improve a transformer of this type having a window in the core thereof in which the windings are arranged.

According to the invention the windings are divided into a number of divisional coils and these divisional coils are so grouped that the sequential order of the divisional coils in adjacent groups is opposite with respect to their relation to the different windings.

Other aspects of my invention will be apparent or will be specifically pointed out in the description forming a part of this specification, but I do not limit myself to the embodiment of the invention herein described, as various forms may be adopted within the scope of the claims.

Referring to the drawing

Fig. 1 shows a cross section through the windings of a transformer,

Fig. 2 a circuit arrangement for this transformer,

Fig. 3 another circuit arrangement and

Fig. 4 a cross section through the windings of a transformer used in connection with Fig. 3.

In Fig. 1 the ferromagnetic core 1 of a transformer has longitudinal windows 2 in which the coils of the high-tension windings 3, 4, 5 are arranged. According to the invention the high-tension windings 3, 4 and 5 are divided each into four divisional coils 3a, 3b, 3c, 3d, 4a, 4b, 4c, 4d, 5a, 5b, 5c, 5d. The coils 3a, 4a, 5a and 3b, 4b, 5b, and so forth, form each a group 7, 8, 9 and 10. The arrangement of the divisional coils within the groups is effected in such a manner that the sequential order in adjacent groups is inversed according to the following scheme:

|                 | Group        |              |              |              |
|-----------------|--------------|--------------|--------------|--------------|
|                 | 7            | 8            | 9            | 10           |
| Divisional coils | 3a, 4a, 5a  | 5b, 4b, 3b   | 3c, 4c, 5c   | 5d, 4d, 3d   |

Furthermore the divisional coils are arranged within each group in such a manner that points having the same alternating potential are adjacent to one another. The direction of winding is the same in all divisional coils. The coils have preferably the form of flat discs.

The arrangement of the invention has the following advantages: Within each individual group the potential between the divisional coils remains constant because points having equal alternating potentials are adjacent to one another. The high dielectric constant of the insulating material has no detrimental effect with regard to the capacitance because there exists no alternating potential between the coils within each group. It is therefore possible to use for the insulation a material having a high dielectric constant so that the distances between the coils can be made very small. An alternating potential exists between adjacent groups so that in this case air is used as the insulator. The capacitance between the individual groups is therefore kept at a small value. The distance between the groups is made such that the capacitance between the groups is kept at a reasonable value.

The arrangement of this type has the result that the total capacitance of a transformer having $n$ groups with $p$ coils each is not larger than that of an air-insulated transformer having $n$ disc coils, while the high tension is $p$ times higher than that of an ordinary transformer with disc coils. At the same time the safety against electric breakdown is kept at a high value. An arrangement of this type makes it possible to use a large number of coils in each group and thereby to increase the high tension to a large degree without at the same time increasing the capacitance of the transformer.

The circuit arrangement of Fig. 2 in which a transformer of the type described is used contains an oscillator tube 11. The grid circuit of this tube is supplied with impulses of the form indicated in the drawing. A saw-tooth current is produced in the anode winding 3 of the tube. The coil 3 is arranged on the transformer core 1 together with the high-tension windings 4 and 5. The high tension produced by the voltage peaks corresponding to the short retrace period of the saw-tooth oscillation is rectified in rectifying tubes 12, 13 and 14 and the unidirectional voltage produced by the circuit arrangement of the rectifying tubes is taken off at the terminals 15 and 16. Condensers 17, 18 and 19 are arranged between the stages of the rectifying arrangement. The heating current for the rectifying tubes is derived from additional windings 20, 21, 22, arranged on the same transformer, in accordance with United States Patent No. 2,218,764 issued October 22, 1940, to Moller and Bahring.

Fig. 3 shows a circuit diagram for an arrangement in which simultaneously deflecting currents and the high tension for the cathode ray tube are produced. The oscillating tube 23 is connected to the anode coil 3 arranged together with a grid coil 24 and high-tension windings 4, 5 and 6 upon the transformer core 1. The deflecting coils 27 are connected by way of a condenser to the winding 24. The arrangement of the windings on the transformer is shown in Fig. 4. The heating current for the rectifying tubes is not taken off from divisional windings but directly from a part of the high-tension windings. Only the last rectifying tube receives its heating current from a separate winding 26. The rectified voltage is taken off at the terminals 15 and 16. The condensers 17, 18 and 19 of Fig. 2 are replaced by a single condenser 25. The high-tension windings are divided in this case into six divisional coils. It is preferable in certain cases to divide the high-tension windings into an even number of divisional coils. Fig. 4 shows that the grid coil 24 of the tube 23 is arranged in the centre of the six groups of coils. This has the advantage that the stray field between anode and grid windings is small, that is, the coupling is very close.

In order to save insulating material between the high-tension windings and the core of the transformer it is preferable to apply a part of the high tension to the core of the transformer. In case all divisional coils are insulated from the core by air it is preferable to apply a voltage equal to approximately half the high potential to the core so that the insulation between the core and the coils has to withstand only half of the high tension. If the divisional coils are insulated from the core by insulating material other than air the core may have a high tension differing from the above-mentioned value. In the embodiment of Fig. 3, for example, the divisional coils 5 and 6 are insulated from the core by an insulating material. In this case it is preferable to apply the rectified high tension directly to the core of the transformer, in accordance with my copending application Serial No. 280,804, filed June 23, 1939. In order to save insulating material and winding space the divisional coils of winding 4 which is connected directly to the core of the transformer are arranged adjacent to the core. The distance between this winding and the core can be kept small because there is no unidirectional voltage between the two. It is furthermore preferable to make the arrangement so that the coils of the anode winding of the tube 23 are arranged adjacent to the grid coil 24, because no high tension exists between these coils.

The transformer arrangement is not limited to the described embodiments. It can be used generally in connection with transformers for producing high potentials. It is particularly of advantage for high-frequency transformers and particularly for the production of high voltages from saw-tooth currents in television apparatus. It makes no difference whether the transformer is arranged behind the amplifier tube or whether it is used directly as a part of the saw-tooth oscillator circuit.

What I claim is:

1. The combination of a transformer having a ferromagnetic core and a plurality of high-tension windings, each winding consisting of a plurality of divisional coils, groups of said coils being arranged on said core in sequential order, each group comprising at least one coil of each winding, the sequential order of said coils in each group being opposite to that of adjacent groups, and of rectifier tubes connected to said high-tension windings, the output circuits of said rectifier tubes being arranged in series.

2. The combination of a transformer having a ferromagnetic core and a plurality of high-tension windings, each winding consisting of a plurality of divisional coils, and of rectifier tubes connected to said high-tension windings, the output circuits of said rectifier tubes being arranged in series, the core of said transformer having a potential equal to a part of the high tension produced in said output circuits.

3. In combination with a saw-tooth oscillator, a transformer having a ferromagnetic core and a plurality of high-tension windings, each winding consisting of a plurality of divisional coils, groups of said coils being arranged on said core in sequential order, each group comprising at least one coil of each winding, the sequential order of said coils in each group being opposite to that of neighboring groups, and rectifier tubes connected to said high-tension windings, the output circuits of said rectifier tubes being arranged in series.

4. The combination of a transformer having a ferromagnetic core and a plurality of high tension windings, each winding consisting of a plurality of divisional coils, groups of said coils arranged on said core in sequential order, each group comprising at least one coil of each winding, the sequential order of said coils in each group being opposite to that of adjacent groups; and of rectifier tubes connected to each of said high-tension windings, the output circuits of said rectifier tubes being arranged in series.

5. The combination of a transformer having a ferromagnetic core and a plurality of high tension windings, each winding consisting of a plurality of divisional coils, groups of said coils arranged on said core in sequential order, each group comprising at least one coil of each winding, adjacent coils of neighboring groups belonging to the same high tension winding; and of rectifier tubes connected to each of said high-tension windings, the output circuits of said rectifier tubes being arranged in series.

6. The combination of a transformer having a ferromagnetic core and a plurality of high tension windings, each winding consisting of a plurality of divisional coils, groups of said coils arranged on said core in sequential order, each group comprising at least one coil of each winding, the sequential order of said coils in each group being opposite to that of adjacent groups, the points of equal alternating potentials of the coils of each group belonging to different windings being situated adjacent to one another; and of rectifier tubes connected to each of said high-tensioned windings, the output circuits of said rectifier tubes being arranged in series.

7. The combination of a transformer and circuit arrangement as claimed in claim 2, wherein the divisional transformer coils are arranged on the core of the transformer in groups in sequential order, each group comprising at least one coil of each winding, the sequential order of said coils in each group being opposite to that of adjacent groups.

8. The combination of a transformer and circuit arrangement as claimed in claim 2, wherein the divisional transformer coils are arranged on the core of the transformer in groups in sequential order, each group comprising at least one coil of each winding, adjacent coils of neighboring groups belonging to the same high tension winding.

9. The combination of a transformer and circuit arrangement as claimed in claim 2, wherein the divisional transformer coils are arranged on the core of the transformer in groups in sequential order, each group comprising at least one coil of each winding, the sequential order of said coils in each group being opposite to that of adjacent groups, the points of equal alternating potentials of the coils of each group belonging to different windings being situated adjacent to one another.

HERBERT BÄHRING.